June 16, 1953 H. L. GLAZE ET AL 2,642,177

SELECTIVE DISTRIBUTING APPARATUS

Filed May 23, 1949 7 Sheets-Sheet 1

INVENTORS.
HERBERT L. GLAZE
ROBERT C. BELTZ
BY THEIR ATTORNEYS.
HARRIS, KIECH, FOSTER & HARRIS
BY

June 16, 1953 H. L. GLAZE ET AL 2,642,177

SELECTIVE DISTRIBUTING APPARATUS

Filed May 23, 1949 7 Sheets-Sheet 2

INVENTORS.
HERBERT L. GLAZE
ROBERT C. BELTZ
BY THEIR ATTORNEYS.
HARRIS, KIECH, FOSTER & HARRIS
BY

INVENTORS.
HERBERT L. GLAZE
ROBERT C. BELTZ
BY THEIR ATTORNEYS.
HARRIS, KIECH, FOSTER & HARRIS
BY

SELECTIVE DISTRIBUTING APPARATUS

Filed May 23, 1949 7 Sheets-Sheet 4

INVENTORS.
HERBERT L. GLAZE
ROBERT C. BELTZ
BY THEIR ATTORNEYS.
HARRIS, KIECH, FOSTER & HARRIS
BY

June 16, 1953 H. L. GLAZE ET AL 2,642,177

SELECTIVE DISTRIBUTING APPARATUS

Filed May 23, 1949 7 Sheets-Sheet 5

INVENTORS.
HERBERT L. GLAZE
ROBERT C. BELTZ
BY THEIR ATTORNEYS.
HARRIS, KIECH, FOSTER & HARRIS
BY

June 16, 1953 H. L. GLAZE ET AL 2,642,177

SELECTIVE DISTRIBUTING APPARATUS

Filed May 23, 1949 7 Sheets-Sheet 6

INVENTORS.
HERBERT L. GLAZE
ROBERT C. BELTZ
BY THEIR ATTORNEYS.
HARRIS, KIECH, FOSTER & HARRIS
BY

June 16, 1953 H. L. GLAZE ET AL 2,642,177

SELECTIVE DISTRIBUTING APPARATUS

Filed May 23, 1949 7 Sheets-Sheet 7

INVENTORS.
HERBERT L. GLAZE
ROBERT C. BELTZ
BY THEIR ATTORNEYS.
HARRIS, KIECH, FOSTER & HARRIS
BY

Patented June 16, 1953

2,642,177

UNITED STATES PATENT OFFICE 2,642,177

SELECTIVE DISTRIBUTING APPARATUS

Herbert L. Glaze, South Pasadena, and Robert C. Beltz, Glendale, Calif., assignors, by mesne assignments, to Read Standard Corporation, a corporation of Delaware Application May 23, 1949, Serial No. 94,906

3 Claims. (Cl. 198—146)

Our invention relates in general to apparatus for selectively distributing articles to different stations and, more particularly, to an apparatus for selectively unloading elements of a conveyor at such stations. Since the invention is particularly applicable to and was originally embodied in an apparatus for selectively unloading elements of a bread cooling conveyor at different slicing and wrapping stations, the invention will be considered in this connection herein for purposes of illustration.

In the bread baking industry, the loaves of bread are customarily loaded on a cooling conveyor as they are removed from the baking oven, the conveyor traveling continuously through a large, air-conditioned cooling chamber. The preferred practice is to employ a cooling conveyor which comprises a plurality of trays or other suitable receptacles carried by endless conveyor chains, or the like, the trays being pivotally connected to the chains for rotation about horizontal axes from generally upright positions into inclined positions to dump the loaves of bread therefrom. In an installation of this nature, it is desirable that several slicing and wrapping units for handling the bread be employed, particularly if the capacity of the installation is large.

In view of the foregoing, a primary object of the invention is to provide an apparatus for automatically distributing the bread carried by the cooling conveyor among the several slicing and wrapping units and, more particularly, to provide an apparatus for distributing the bread to the slicing and wrapping units selectively and in variable proportions.

Expressed somewhat differently, a primary object of the invention is to provide an apparatus for dividing the bread carried by the cooling conveyor into predetermined, and preferably equal, proportions and for distributing the bread among selected ones of the slicing and wrapping units.

Another object is to provide an apparatus which may be employed to divide the bread carried by the cooling conveyor into as many portions as there are slicing and wrapping units in operation, and which will deliver such portions to the respective operating units, the number of units in operation being variable.

Another object is to provide an apparatus having means whereby the slicing and wrapping units among which the bread carried by the cooling conveyor is to be distributed may be selected quickly and easily by the operators of the apparatus.

Another object is to provide an apparatus comprising a series of unloading devices spaced along the cooling conveyor and adapted to rotate the cooling trays into their respective dumping positions, there being one unloading device for each slicing and wrapping unit.

Another object is to provide an apparatus wherein all but the last unloading device in the series are movable between extended and retracted positions and are inoperative to rotate the cooling trays into their unloading positions when retracted. With this arrangement, all of the cooling trays are rotated into their unloading positions by the last unloading device in the series so that any trays not unloaded by the preceding unloading devices are unloaded by the last in the series, which is an important feature.

Another object is to provide an apparatus wherein the movable unloading devices operate at a frequency less than the frequency of movement of the cooling trays therepast so that each of the movable unloading devices is capable of rotating only part of the cooling trays into their unloading positions.

An important object is to provide an apparatus having means for varying both the frequency of operation of the movable unloading devices and the number of such devices in operation to control the distribution of the bread amond the various slicing and wrapping units.

Another object is to provide a common actuator for all of the movable unloading devices and to provide means for selectively connecting the movable unloading devices to the actuator.

Another object is to provide an apparatus having control means operating in timed relation with the cooling conveyor for varying the frequency of energization of the actuator so as to vary the frequency of operation of the movable unloading devices.

An important object of the invention is to provide unloading devices capable of jarring the cooling trays during unloading so as to loosen any loaves of bread which may stick to the trays.

The foregoing objects and advantages of the invention, together with various other objects and advantages thereof which will become evident in the light of the disclosure which follows, may be attained through the employment of the exemplary embodiment which is described in detail hereinafter and which is illustrated in the accompanying drawings. Referring to the drawings.

Figures 3, 4:
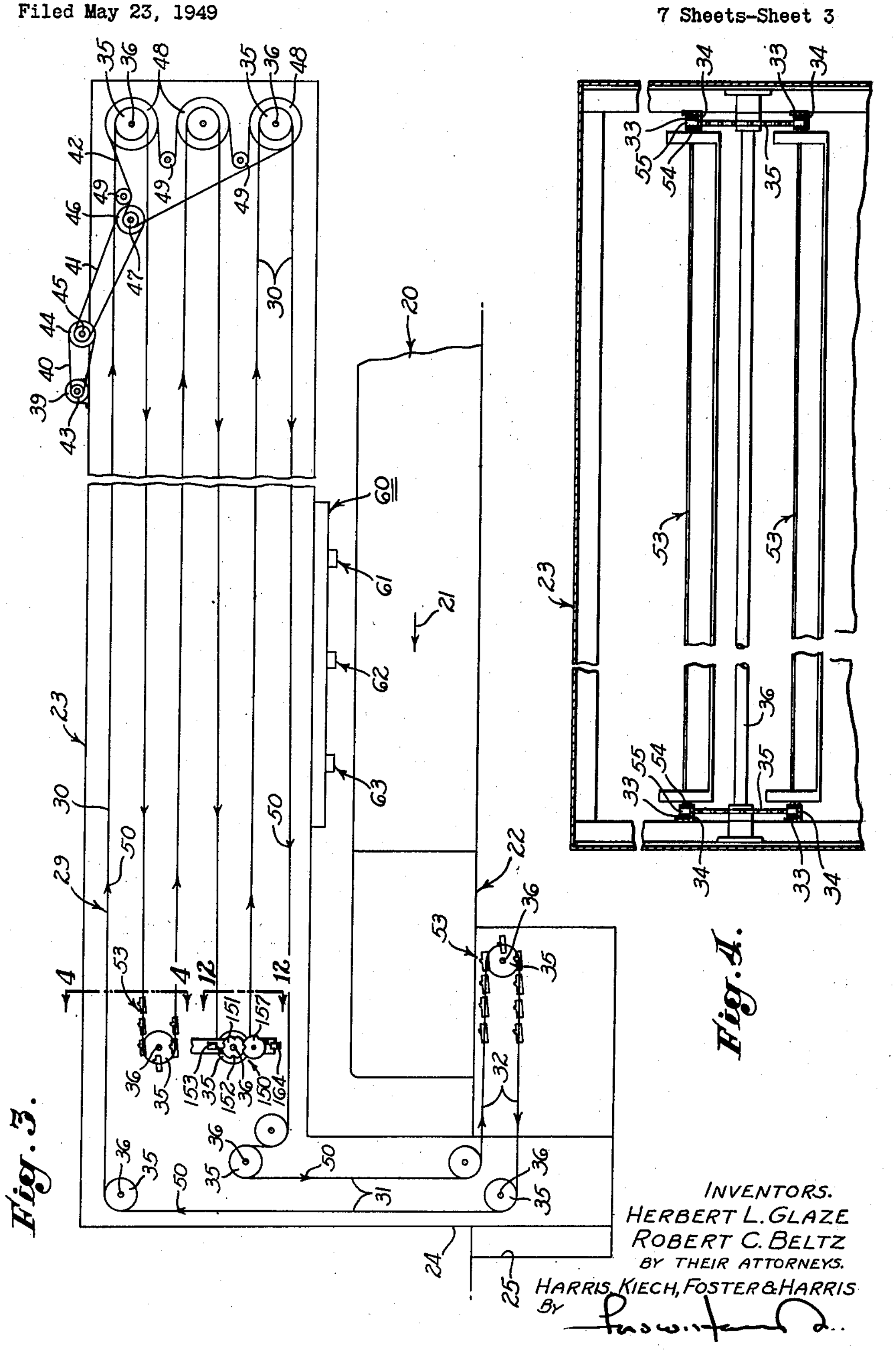
Fig. 3 is a semidiagrammatic side elevational view, partially in section, taken along the broken line 3—3 of Fig. 2.
Fig. 4 is an enlarged, fragmentary sectional view taken along the broken line 4—4 of Fig. 3 and illustrating a portion of a cooling conveyor which forms part of the installation.
Figures 9, 10, 11, 12, 13:
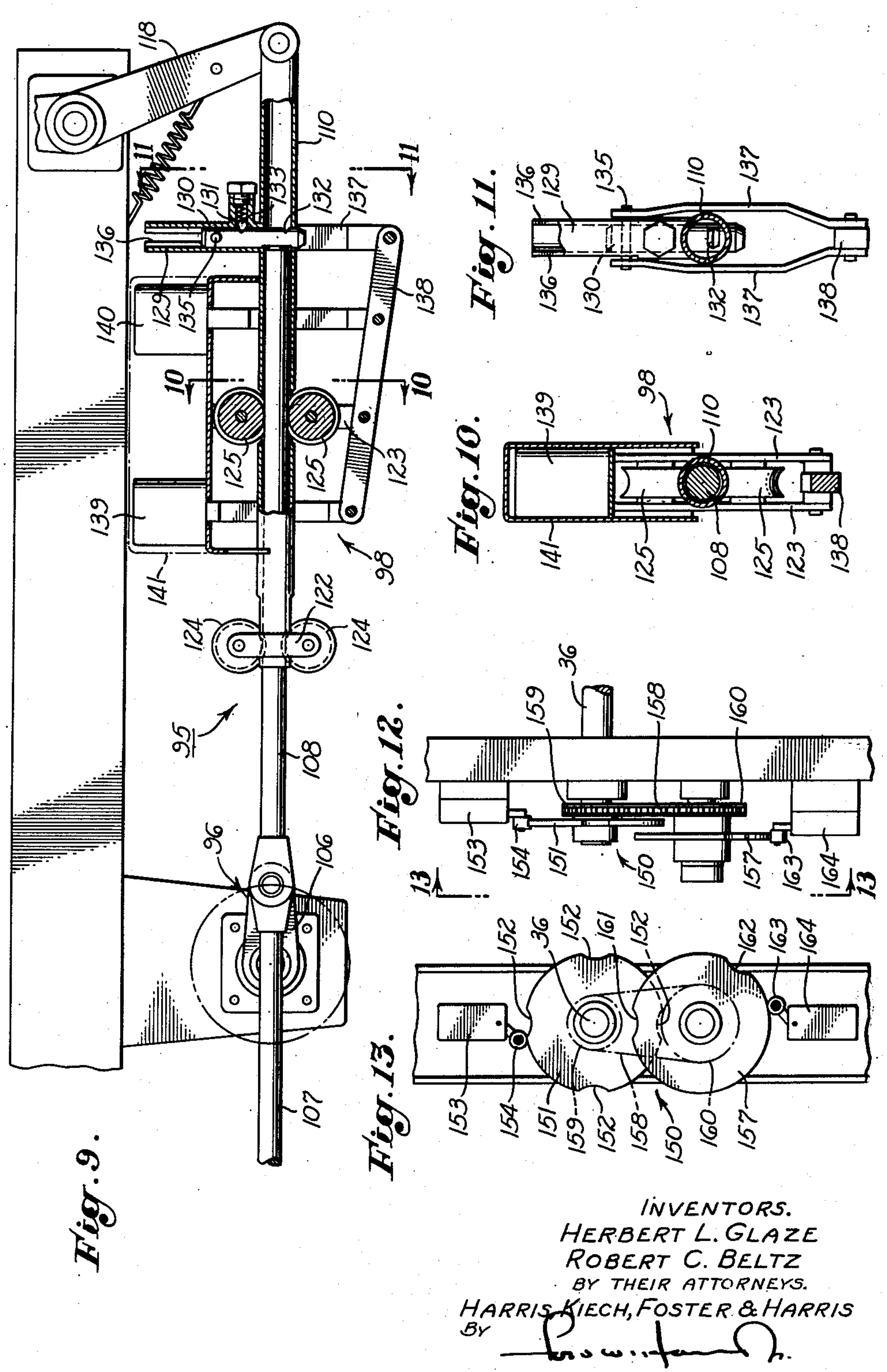
Fig. 9 is an enlargement, partially in section, of a portion of Fig. 6.
Figure 14:
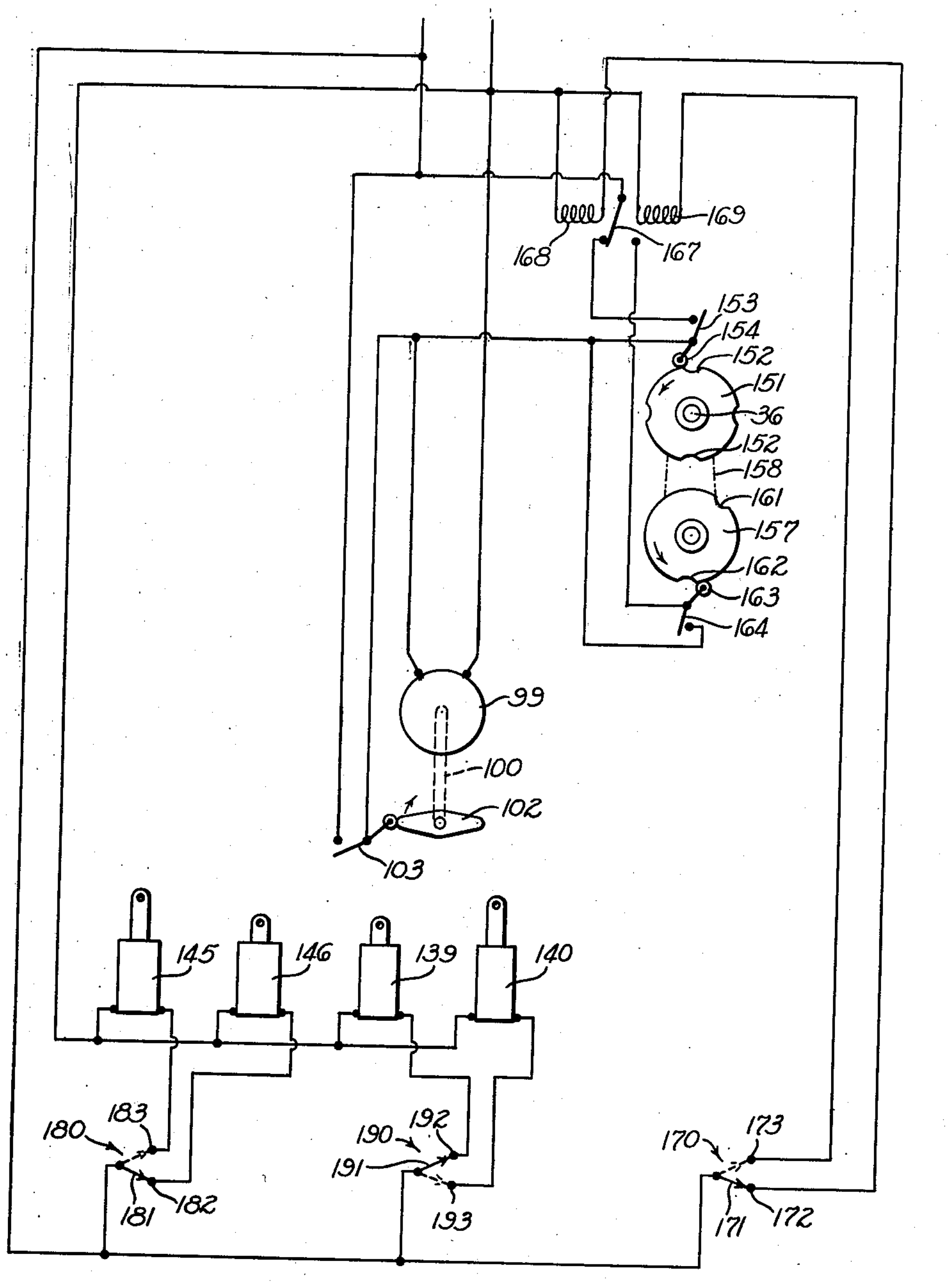

Figs. 10 and 11 are fragmentary sectional views respectively taken along the broken lines 10—10 and 11—11 of Fig. 9;

Fig. 12 is an enlarged, fragmentary sectional view taken along the broken line 12—12 of Fig. 3 and illustrating a control means of the invention;

Fig. 13 is an elevational view of the control means shown in Fig. 12 and is taken in the direction of the arrows 13 in Fig. 12; and, Fig. 14 is a diagrammatic view of an electrical circuit forming part of the apparatus.

Figure 1:
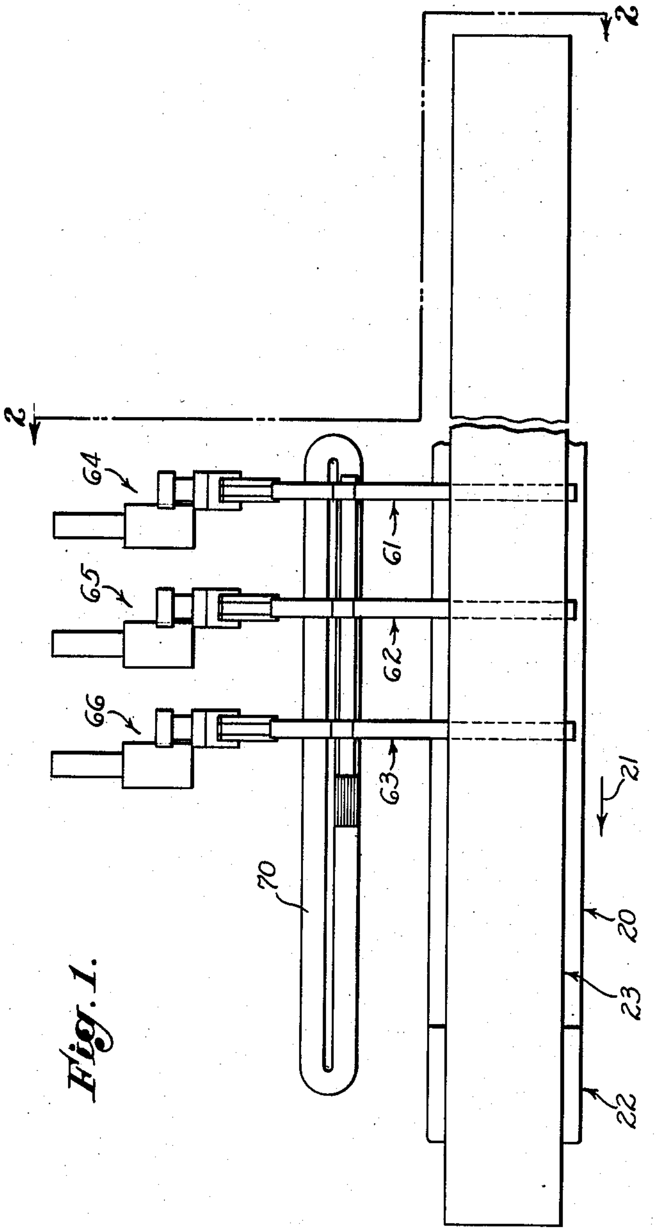
Fig. 1 is a semidiagrammatic plan view of an installation incorporating a selective bread distributing apparatus which embodies the invention.
Figure 2:
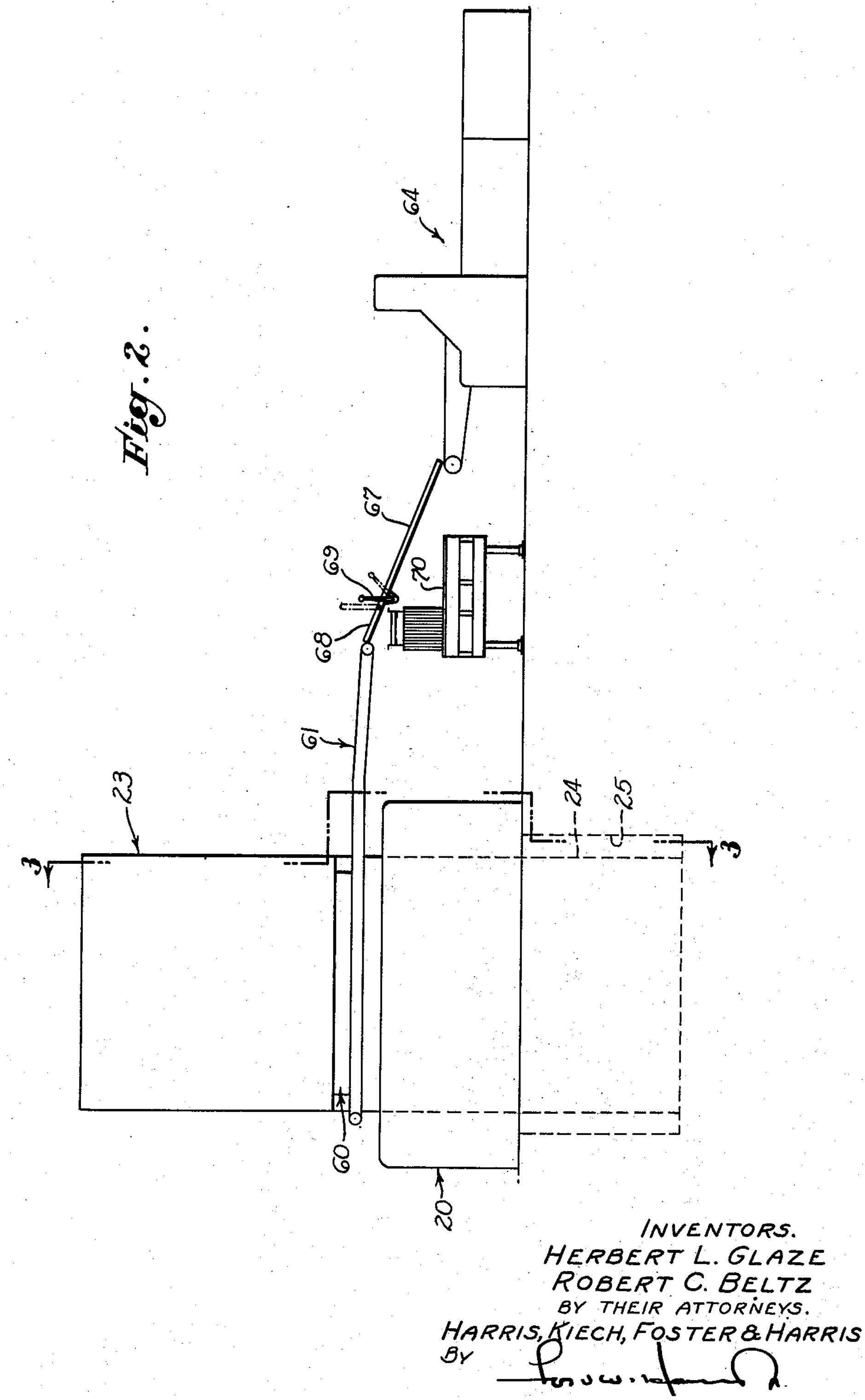
Fig. 2 is a semidiagrammatic elevational view of the installation and is taken along the broken line 2—2 of Fig. 1.

Referring particularly to Figs. 1 to 3 of the drawings, the numeral 20 designates an oven which may be of the traveling type, in which case the loaves of bread being baked move continuously therethrough in the direction of the arrows 21. The baked loaves emerging from the oven 20 may be removed therefrom in any suitable manner, as by an automatic oven unloader 22 which is disclosed in application Serial No. 49,764, filed September 17, 1948 in the names of Hiram E. Temple and George E. Tench and assigned to the same assignee as the present application.

As is conventional, an air-conditioned cooling cabinet or chamber 23 is located above the oven 20. In the particular construction illustrated, the cooling chamber 23 includes a section 24 which extends downwardly into a pit 25, the latter extending beneath the oven unloader 22.

Referring particularly to Fig. 3 of the drawings, located within the cooling chamber 23 is an endless cooling conveyor 29 having a plurality of horizontal runs 30, a pair of vertical runs 31 extending downwardly through the section 24 of the chamber into the pit 25, and a pair of horizontal runs 32 extending beneath the oven unloader 22. As best shown in Fig. 4, the cooling conveyor 29 comprises a pair of spaced, parallel chains 33 the horizontal runs of which are supported by rails 34, the chains being trained around suitably located sprockets 35 on shafts 36. As best shown in Fig. 3 of the drawings, the cooling conveyor 29 is driven by a motor 39 through chains 40, 41 and 42, the chain 40 being trained around a sprocket 43 which is driven by the motor and around a sprocket 44, the chain 41 being trained around a sprocket 45 fixedly connected to the sprocket 44 and around a sprocket 46, and the chain 42 being trained around a sprocket 47 fixedly connected to the sprocket 46 and around sprockets 48 mounted on certain of the shafts 36 and fixedly connected to the corresponding sprockets 35 thereon. The chain 42 is also trained around idling sprockets 49. The motor 39 drives the cooling conveyor 29 in the direction indicated by the arrows 50.

The cooling conveyor 29 includes a plurality of receptacles or trays 53 which are spaced along and supported by the cooling conveyor chains 33, the cooling trays 53 being rotatable relative to the chains about horizontal axes between generally upright positions and forwardly inclined dumping or unloading positions. Preferably, when the cooling trays are in their generally upright positions, they are inclined rearwardly slightly to eliminate any possibility of the loaves of bread sliding therefrom. As best shown in Fig. 4 of the drawings, the cooling trays 53 are pivoted for rotation about horizontal axes by means of a pair of horizontally spaced, axially aligned spindles 54 on each tray, the spindles being carried by bearings 55 on the cooling conveyor chains 33. The horizontal axes of rotation provided by the pairs of spindles 54 are so located relative to the centers of gravity of the cooling trays 53 that the trays are normally maintained in generally upright, i. e., slightly rearwardly inclined, positions by the action of gravity.

Figures 5, 8:
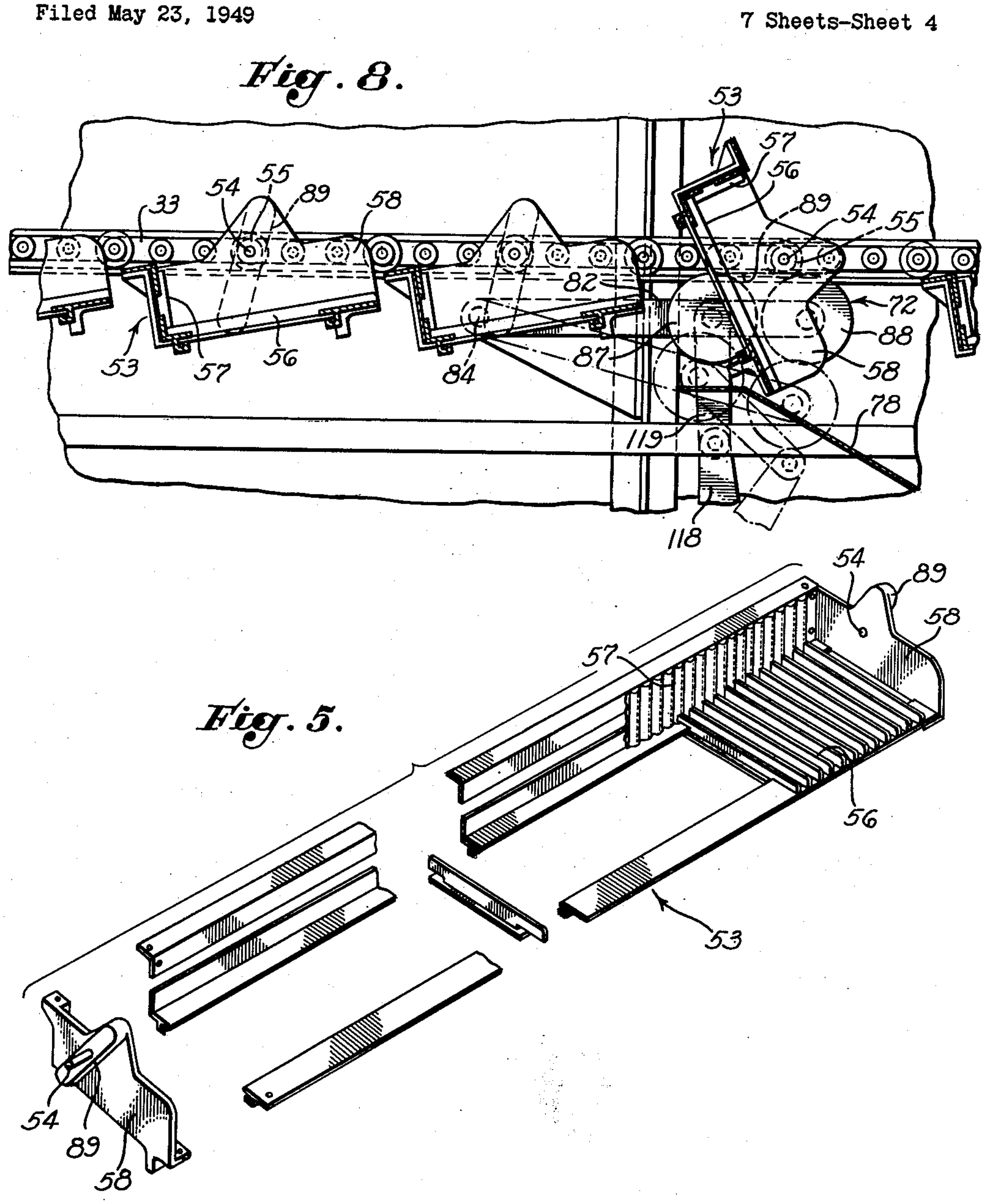
Fig. 5 is an enlarged perspective view of a cooling tray forming part of the cooling conveyor, parts of the tray being broken away to reveal the structure thereof more clearly.
Fig. 8 is an enlarged, fragmentary sectional view taken along the broken line 8—8 of Fig. 7.

Referring particularly to Fig. 5 of the drawings, the cooling trays 53 may be of any desired construction and may, for example, include a lower wall 56, a rear wall 57 and a pair of end walls 58, the latter carrying the spindles 54. The forward side of each tray 53 is open to permit loaves of bread carried thereby to slide therefrom when it is rotated into its dumping or unloading position, i. e., when it is rotated in the clockwise direction as viewed in Fig. 5 of the drawings. In order to permit air circulation about the loaves of bread carried by each tray 53 to insure uniform cooling thereof, the lower and rear walls 56 and 57 are preferably ribbed, as shown.

Referring again to Fig. 3 of the drawings, the cooling trays 53 passing beneath the oven unloader 22 are adapted to receive loaves of bread removed from the oven 20 thereby and to move such loaves continuously through the cooling chamber 23 to a distributing apparatus of the invention which is located beneath the lowermost horizontal run 30 in the cooling chamber and which is indicated generally by the numeral 60. As will be discussed in detail hereinafter, the apparatus 60 is adapted to selectively distribute the loaves of bread carried by the cooling trays 53 among cross conveyors 61, 62 and 63 which, as best shown in Fig. 1 of the drawings, respectively lead to slicing and wrapping units 64, 65 and 66, three such units being shown for purposes of illustration. As best shown in Fig. 2 of the drawings, each of the cross conveyors includes a chute 67 a portion 68 of which is hinged so that it may be rotated out of alignment by means of a handle 69 to permit the loaves of bread to drop onto a conveyor leading to a sorting table 70 in the event that it is necessary to terminate flow of bread to one of the slicing and wrapping units suddenly for some reason. For example, it may be necessary to terminate the flow of bread to one of the slicing and wrapping units in the event of a jam in such unit. Any bread dumped onto the sorting table 70 in this manner may subsequently be recovered and fed into the slicing and wrapping units 64 to 66 by the operators thereof.

Figure 6:
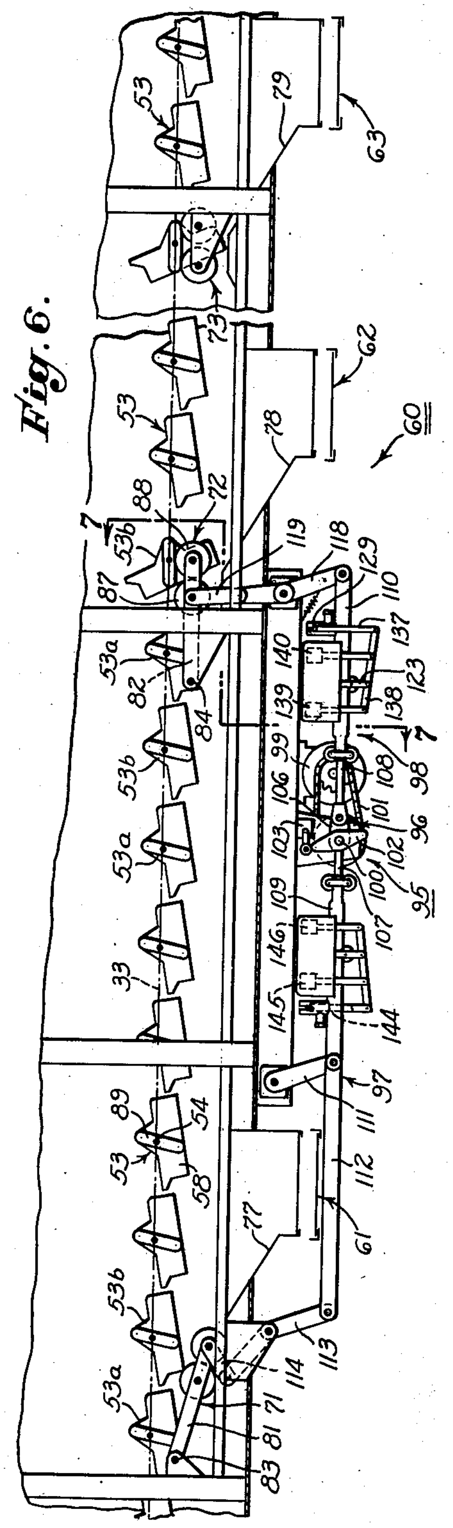
Fig. 6 is a side elevational view of the selective distributing apparatus of the invention.

The foregoing completes a general consideration of an installation incorporating the distributing apparatus 60 of the invention and the latter will now be considered in more detail with particular reference to Fig. 6 of the drawings. Referring thereto, the selective distributing apparatus 60 includes a series of unloading or dumping devices 71, 72 and 73 respectively corresponding to the cross conveyors 61, 62 and 63 and spaced apart along the lowermost horizontal run 30 of the cooling conveyor 29, each dumping device being located ahead of or upstream from the corresponding cross conveyor so that loaves of bread dumped thereby may fall onto an inclined chute leading to such cross conveyor. The inclined chutes associated with the dumping devices 71 to 73 and leading to the cross conveyors 61 to 63 are respectively identified by the numerals 77, 78 and 79.

The dumping devices 71 to 73 are adapted to be engaged by the cooling trays 53 to rotate them into their unloading positions so as to dump the bread therefrom onto the chutes 77 to 79 leading to the cross conveyors 61 to 63 as will be described in more detail subsequently. For a reason which will be discussed hereinafter, the first two dumping devices in the series, i. e., the dumping devices 71 and 72, are movable between extended positions wherein they are engageable by the cooling trays and are operative to rotate them into their unloading positions, and retracted positions wherein they are not engageable by the cooling trays and are inoperative to rotate them into their unloading positions. The third dumping device 73 in the series is permanently disposed in the path of the cooling trays 53 so that it is engageable by all of them and rotates all of them into their unloading positions, irrespective of whether the loaves of bread have been dumped therefrom by one of the preceding dumping devices in the series. As will be discussed in more detail hereinafter, the movable devices 71 and 72 may be actuated selectively to control the distribution of bread to the slicing and wrapping units 64 to 66.

The movable dumping devices 71 and 72 respectively include arms 81 and 82 which are pivotally connected to the frame of the apparatus at 83 and 84 so that these devices are rotatable between their extended and retracted positions. In Fig. 6 of the drawings, the dumping device 71 is shown in its retracted or inoperative position wherein it is out of the path of the cooling trays 53, and the dumping device 72 is shown in its extended or operative position wherein it is in the path of the cooling trays 53 and is adapted to be engaged thereby to rotate them into their unloading positions. In Fig. 8 of the drawings, the dumping device 72 is shown in its extended position in solid lines and in its retracted position in phantom. The actuating means for extending and retracting the movable dumping devices 71 and 72 will be considered in more detail hereinafter.

Except for the fact that the dumping devices 71 and 72 are movable and the dumping device 73 is fixed, these devices are all identical and only the device 72 will be considered in detail. Referring particularly to Fig. 8 of the drawings, the dumping device 72 includes a pair of cam rollers 87 and 88 which are carried by the arm 82 and which are spaced apart horizontally therealong when the device 72 is in its extended position. The cam rollers 87 and 88 are adapted to be engaged by a cam follower device 89 on each of the cooling trays 53 to rotate the trays into their unloading positions, each cam follower device comprising a projecting lug or bar on one of the tray's end walls 58. In the particular construction illustrated, the cam follower bars are shown inclined with respect to the vertical when the cooling trays 53 are in their upright positions, but the bars may be vertical under such conditions if desired. Also, the angle of inclination of the cam follower bars 89 may be varied. As will become apparent, the angles at which the cam follower bars 89 are set determine the extent to which the trays 53 are rotated by the dumping devices 71 to 73.

Considering the operation of the dumping device 72 with continued reference to Fig. 8 of the drawings, when the dumping device 72 is in its extended position, the cam rollers 87 and 88 are in the path of the cam follower bars 89 and are located below the horizontal axes of rotation of the cooling trays 53. Thus, when the cam follower bar 89 on a particular cooling tray 53 engages the first cam roller 87 of the dumping device 72, that cooling tray is rotated into its unloading position, as shown in Fig. 8 of the drawings, to dump the loaves of bread carried thereby onto the chute 78 leading to the cross conveyor 62. Because of the horizontal spacing between the first cam roller 87 and the second cam roller 88, when the cam follower bar 89 on the cooling tray 53 under consideration disengages the first cam roller, the tray tends to return to its upright position under the action of gravity with the result that its cam follower bar strikes the second cam roller. Subsequently, the second cam roller 88 returns the tray to its unloading position, and, after disengaging the second cam roller, the tray returns to its upright position under the action of gravity.

When the cam follower bar 89 on a particular cooling tray 53 strikes the second cam roller 88 of the dumping device 72 in the foregoing manner, the tray is jarred to loosen any loaves of bread which may be sticking thereto, which is an important feature of the invention. Subsequently, any stuck loaves loosened in this manner are dumped from the tray upon its return to its unloading position by the second cam roller 88. As will be apparent, the magnitude of the jarring force may be varied by varying the spacing between the cam rollers 87 and 88.

Figure 7:
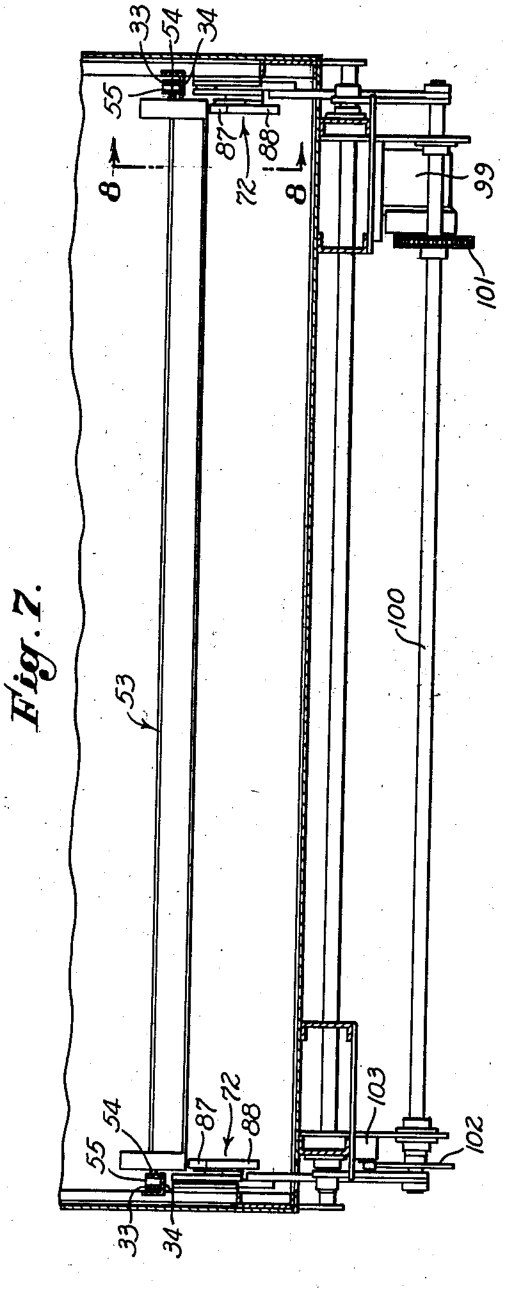
Fig. 7 is a sectional view taken along the broken line 7—7 of Fig. 6.

Although each of the dumping devices 71 to 73 has been described as including a pair of cam rollers 87 and 88 on one side of the cooling conveyor 29, it will be understood that such cam rollers may be provided on both sides of the cooling conveyor so as to act on both ends of each cooling tray 53. In such case, each cooling tray is provided with a pair of cam follower bars 89 respectively mounted on the end wall 58 thereof, as indicated in Fig. 5 of the drawings. Such a dual arrangement of cam rollers 87 and 88 for each of the dumping devices is indicated in Fig. 7 of the drawings.

Continuing to refer particularly to Fig. 6 of the drawings, the selective distributing apparatus 60 includes an actuating means 95 for periodically moving the dumping devices 71 and 72 from their respective retracted positions to their extended positions and back to their retracted positions, the frequency of such movement being variable to control the distribution of bread to the slicing and wrapping units 64 to 66 as will be discussed in more detail hereinafter. Also, one or the other of the dumping devices 71 and 72, or, in some instances, both, may be rendered inoperative to control the distribution of bread to the various units, the manner in which this is accomplished also being discussed in more detail hereinafter.

Considering the actuating means 95 in more detail, it includes an actuator 96 and linkage means 97 and 98 respectively connecting the actuator to the dumping devices 71 and 72, each linkage means including engageable and disengageable elements for rendering the dumping device controlled thereby operative or inoperative as will be discussed in more detail hereinafter. The actuator 96 includes an electric motor 99 which drives a shaft 100 through a chain 101, the shaft 100 carrying a two-lobed cam 102 each lobe of which is adapted to engage and open a switch 103 in series with the motor 99, the two lobes of the cam being diametrically opposite. As will be apparent, the motor 99 will drive the shaft 100 one-half of a revolution at a time with this arrangement, the reason for such step-by-step rotation of the shaft 100 being considered in detail hereinafter.

Fixed on the shaft 100 is a crank 106 having rods 107 and 108 pivotally connected thereto, the latter respectively forming parts of the linkage means 97 and 98. The rods 107 and 108 respectively extend into tubes 109 and 110, the former being pivotally connected to a crank 111 which is rotatably mounted on the frame of the distributing apparatus. Pivotally connected at one end to the crank 111 is a link 112 which is pivotally connected at its other end to one arm of a bell crank 113 rotatably mounted on the frame of the distributing apparatus. Pivotally connected to the other arm of the bell crank 113 is a link 114 which is also pivotally connected to the arm 81 of the dumping device 71. As will be apparent, reciprocatory movement of the tube 109 will, through the foregoing linkage, rotate the dumping device 71 between its extended and retracted positions.

In a similar manner, the tube 110 is pivotally connected to one arm of a bell crank 118 which is rotatably mounted on the frame of the apparatus, the other arm of the bell crank being pivotally connected to the arm 82 of the dumping device 72 through a link 119. Thus, reciprocatory movement of the tube 110 results in rotational movement of the dumping device 72 between its extended and retracted positions.

Referring particularly to Fig. 9 of the drawings, it will be noted that as long as the rod 108 and the tube 110 are disengaged, relative telescoping movement thereof can occur so that the linkage means 98 will not communicate rotary motion of the crank 106 to the dumping device 72 with the result that this dumping device will remain in its retracted or inoperative position. In order to reduce friction during such relative telescoping movement of the rod 108 and the tube 110, the tube is provided with standards 122 and 123 respectively carrying paired rollers 124 and 125 which extend through cutouts in the tube into engagement with the rod. Thus, the rod 108 and the tube 110 are connected for relative telescoping movement through the paired rollers 124 and 125.

In order to engage the rod 108 and the tube 110 so as to render the dumping device 72 operative, the tube 110 carries a transverse tubular guide 129 for a latch 130 which is movable in the guide from an extended position, shown in Fig. 9 of the drawings, wherein it extends into and preferably through the tube 110, to a retracted position, wherein it is withdrawn from the tube, the latch being provided with notches 131 and 132 respectively adapted to receive a spring pressed detent 133 for holding the latch in its extended and retracted positions. As will be apparent, when the latch 130 is in its extended position, it prevents movement of the rod 108 through the tube 110 toward the right, as viewed in Fig. 9, so that rotary motion of the crank 106 is communicated to the dumping device 72 through the linkage means 98 to move this dumping device from its retracted position to its extended position. However, when the latch 130 is withdrawn from the tube 110 into its retracted position, the tube 108 and the rod 110 are disengaged and may telescope freely so that the rotary motion of the crank 106 is not communicated to the dumping device 72, whereupon the latter remains in its retracted position during rotation of the crank. The position of the latch 130 may be controlled by the operator of the selective distributing apparatus 60 in a manner about to be described.

The latch 130 carries a pin 135 which is movable in slots 136 in the tubular guide 129, a pair of links 137 being pivotally connected to the latch by means of the pin 135, as best shown in Fig. 11 of the drawings. The links 137 are pivotally connected to one end of a lever 138 which is pivotally connected intermediate its ends to the standard 123 on the tube 110. Pivotally connected to the opposite end of the lever 138 is a movable-core electromagnet 139 and pivotally connected to the lever intermediate the standard 123 and the links 137 is another electromagnet 140, the electromagnets being mounted in a housing 141 which is suitably connected to the tube 110. As will be apparent, if the electromagnet 139 is energized, the lever 138 will be rotated so as to cause the links 137 to move the latch 130 into its extended position to engage the rod 108 and the tube 110 and, if the electromagnet 140 is energized, the latch will be moved to its retracted position to disengage the rod and the tube. Energization of the electromagnets 139 and 140 is controlled manually by the operator in a manner to be described hereinafter in connection with the schematic wiring diagram of Fig. 14 of the drawings.

The linkage means 97 connecting the dumping device 71 to the crank 106 includes a similar latch 144 for engaging and disengaging the rod 107 and the tube 109, and includes electromagnets 145 and 146 for operating the latch 144 in substantially the same manner. As will be apparent, energization of the electromagnet 145 will produce retraction of the latch 144 to disengage the rod 107 and the tube 109, and energization of the electromagnet 146 will produce extension of the latch 144 to engage the rod 107 and the tube 109.

It will be apparent that, with the foregoing construction, if no bread is to be delivered to the slicing and wrapping unit 64, this may be accomplished by energizing the electromagnet 145 so as to retract the latch 144, thereby disengaging the rod 107 and the tube 109 to prevent movement of the dumping device 71 into its extended position by the crank 106 of the actuator 96. Similarly, if no bread is to be delivered to the slicing and wrapping unit 65, the electromagnet 140 may be energized to retract the latch 130, thereby disengaging the rod 108 and the tube 110 so as to prevent movement of the dumping device 72 into its extended position by the crank 106.

Considering the operation of the actuating means 95 as a whole, it will be apparent from Fig. 6 of the drawings that as the motor 99 rotates the shaft 100 through one-half of a revolution under the control of the switch 103, one of the movable dumping devices 71 and 72 will be moved from its retracted position to its extended position to intercept and dump one of the cooling trays 53 and the other will be moved from its extended position to its retracted position after having dumped another of the cooling trays, assuming that both of these dumping devices are connected to the actuator 96 through the linkage means 97 and 98 in the manner hereinbefore described. During the next one-half revolution of the shaft 100, the dumping device which was extended during the preceding one-half revolution will be retracted and the dumping device which was retracted during the preceding one-half revolution will be extended. As will be apparent, it is necessary for the actuator 96 to operate the dumping devices 71 and 72 in timed relation with the cooling conveyor 29 and the manner in which this is accomplished will now be considered.

Referring to Fig. 3 and particularly to Figs. 12 and 13 of the drawings, the selective distributing apparatus 60 includes a control means 150 for regulating the frequency of energization of the motor 99 of the actuating means 95. The control means 150 includes a cam 151 which is employed when distribution of bread between only two of the slicing and wrapping units 64 to 66 is desired, this cam being fixed on one of the shafts 36 of the cooling conveyor 29 so that the rotational speed of this cam is directly proportional to the linear speed of the cooling trays 53. The cam 151 is provided with notches 152 which are spaced apart circumferentially of the cam equal distances proportional to the spacing of the cooling trays 53, the latter being spaced apart equal distances. Thus, the frequency of movement of the notches 152 past a given point adjacent the periphery of the cam 151 is equal to the frequency of movement of the cooling trays 53 past a given point adjacent the cooling conveyor 29. In the particular construction illustrated, the spacing of the cooling trays 53 is so related to the diameter of the sprocket 35 on the shaft 36 carrying the cam 151 that one revolution of the shaft moves a given cooling tray 53 a distance equal to four times the tray spacing. Accordingly, with this construction, it is necessary to provide the cam 151 with four of the notches 152. It will be understood, however, that the invention is not limited to any particular number of notches for the cam 151 since the number required depends on the relationship discussed above.

Mounted adjacent the cam 151 is a switch 153 which is connected in series with the motor 99 and in parallel with the switch 103 and which is adapted to be closed to energize the motor whenever a roller 154 on the switch drops into one of the notches 152 in the cam. Thus, the motor 99 is energized intermittently by the switch 153 under the control of the cam 151, the frequency of energization of the motor being equal to the frequency of movement of the cooling trays 53 past a point adjacent the cooling conveyor 29 since, as hereinbefore discussed, the frequency of movement of the notches 152 in the cam past a point thereadjacent is equal to the frequency of movement of the cooling trays past a given point. The roller 154 remains in each of the notches 152 for a length of time sufficient to permit the two-lobed cam 102 on the shaft 100 to disengage the switch 103 so that the latter may close to supply current to the motor after the roller 154 leaves one of the notches 152 to open the switch 153. As previously pointed out, the two-lobed cam 102 opens the switch 103 after each one-half revolution of the shaft 100 so as to deenergize the motor. Thus, for each closure of the switch 153 by the notches 152 in the cam 151, the motor 99 rotates the shaft 100 through one-half of a revolution.

As previously indicated, the cam 151 of the control means 150 is employed when distribution of bread to only two of the wrapping and slicing units 64 to 66 is desired, the manner in which this is accomplished being considered in more detail hereinafter. The control means 150 also includes a cam 157 which is employed when it is desired to distribute bread to all three of the slicing and wrapping units, the cam 157 being driven in timed relation with the cam 151 by a chain 158 trained around sprockets 159 and 160 respectively connected to the cams 151 and 157. As will become apparent, it is necessary for the cam 157 to rotate at a speed equal to two-thirds of the speed of the cam 151 in the particular illustrative construction under consideration, the diameters of the sprockets 159 and 160 being so related as to provide this ratio.

The cam 157 is provided with two notches 161 and 162 therein, the notches being adapted to receive a roller 163 of a switch 164 to close this switch. As will be discussed in more detail hereinafter, the switch 164 is connected in series with the motor 99 and in parallel with the switch 153 controlled by the cam 151, means being provided in the electrical circuit for permitting the switches 153 and 164 to be used selectively to control the motor 99 as will be discussed in more detail hereinafter. The notches 161 and 162 are nonuniformly spaced, as best shown in Fig. 13 of the drawings. With the particular illustrative construction under consideration, it is necessary for the notch 162 to be spaced 120° from the notch 161 in the clockwise direction, as viewed in Fig. 13, and to be spaced 240° from the notch 161 in the counterclockwise direction. The reason for this relationship will become apparent during consideration of the operation of the selective distributing apparatus 60.

Thus, with the foregoing construction, the frequency of energization of the motor 99 under the control of the cam 157 will be equal to one-third of the frequency of movement of the cooling trays 53 past a given point, but will be irregular because of the nonuniform spacing of the notches 161 and 162. As is the case when the motor 99 is controlled by the cam 151, the motor will rotate the shaft 100 one-half of a revolution each time the cam 157 closes the switch 164, the rotation of the shaft 100 being limited to one-half of a revolution for each closure of the switch 164 by the two-lobed cam 102 in the manner hereinbefore discussed.

Referring now of Fig. 14 of the drawings, it will be seen that the switch 103 controlled by the two-lobed cam 102 and the switches 153 and 164 respectively controlled by the cams 151 and 157 are all connected in series with the motor 99 and in parallel with each other so that the motor is energized when any one of these switches is closed. However, the switches 153 and 164 are adapted to be employed selectively to control the distribution of bread among the slicing and wrapping units 64 to 66 as will be discussed in more detail hereinafter, this being accomplished by employing a switch 167 which is connectible in series with either the switch 153 or the switch 164. The switch 167 is controlled by relays 168 and 169, and, as will be apparent, if the relay 168 is energized, the switch 167 will be connected in series with the switch 153 controlled by the cam 151 and, if the relay 169 is energized, the switch 167 will be connected in series with the switch 164 controlled by the cam 157. The relays 168 and 169 may be energized selectively by the operator of the apparatus by means of a selector switch 170 connected in series with the two relays, the relay 168 being energized when a movable arm 171 of the selector switch 170 is in engagement with a contact 172, and the relay 169 being energized when the movable arm 171 is in engagement with a contact 173. Thus, when the movable arm 171 engages the contact 172, the apparatus is controlled by the cam 151 and, when the movable arm is in engagement with the contact 173, the apparatus is controlled by the cam 157.

The electrical circuit of the distributing apparatus 60 also includes selector switches 180 and 190 for engaging and disengaging the actuator 96 with respect to the dumping devices 71 and 72. The selector switch 180 includes a movable arm 181 which is adapted to engage either a contact 182 or a contact 183 and the switch 190 includes a similar movable arm 191 which is adapted to engage either a contact 192 or a contact 193. When the movable arm of the switch 180 engages the contact 182, the electromagnet 146 is energized to extend the latch 144, thereby engaging the rod 107 and the tube 109 of the linkage means 97 so as to connect the unloading device 71 to the actuator 96. Similarly, when the movable arm of the switch 190 engages the contact 192, the electromagnet 139 is energized to extend the latch 130, thereby engaging the rod 108 and the tube 110 of the linkage means 98 so as to connect the unloading device 72 to the actuator 96. Conversely, when the movable arms 181 and 191 of the respective switches 180 and 190 engage the respective contacts 183 and 193 thereof, the respective electromagnets 145 and 140 are energized to retract the respective latches 144 and 130, thereby disconnecting the respective dumping devices 71 and 72 from the actuator.

The over-all operation of the selective distributing apparatus 60 will now be considered with particular reference to Figs. 6 and 14 of the drawings. As a matter of convenience, the operation of the apparatus under the control of the cam 151 will be considered first. As previously indicated, when controlled by the cam 151, the apparatus may be employed to distribute bread to only two of the slicing and wrapping units 64 to 66. In order to place the apparatus under the control of the cam 151, it is necessary for the operator to set the selector switch 170 in the position shown in solid lines in Fig. 14 of the drawings, thereby energizing the relay 168 to place the switch 153 controlled by the cam 151 in series with the motor 99.

As a matter of convenience in considering the operation of the apparatus under the control of the cam 151, it will be assumed that the bread carried by the cooling conveyor 29 is to be distributed to the first two slicing and wrapping units 64 and 65. In order to accomplish this, the operator sets the selector switches 180 and 190 in the positions shown in solid lines in Fig. 14 of the drawings so as to energize the electromagnets 139 and 146, these electromagnets then extending the latches 130 and 144 to connect the respective dumping devices 72 and 71 to the actuator 96.

With the foregoing conditions obtaining, when the cam 151 is rotated into a position such that the roller 154 on the switch 153 drops into one of the notches 152 in the cam, the motor 99 is energized. At this point, the switch 103 will be held open by the two-lobed cam 102. However, as soon as the cam 102 disengages the switch 103 to permit it to close, an alternative current path to the motor 99 is established so that subsequent opening of the switch 153 by movement of the roller 154 out of the notch 152 under consideration will not interrupt the current to the motor. Thus, the switch 153 needs be energized only momentarily by the cam 151. As previously discussed, the two-lobed cam 102 limits rotation of the shaft 100 on which it is mounted to one-half of a revolution, the motor 99 thereafter remaining de-energized until the roller 154 on the switch 153 drops into the next notch 152 in the cam 151.

Referring now to Fig. 6 of the drawings, it will be noted that the cooling trays 53 are identified by the numerals 53*a* and 53*b* in alternating relation, the trays identified by the reference characters 53*a* being adapted to be rotated into their unloading positions by the dumping device 71 and the trays identified by the reference character 53*b* being adapted to be rotated into their unloading positions by the dumping device 72 in a manner about to be described. As a matter of convenience, it will be assumed that the first one-half revolution of the shaft 100 results in movement of the respective dumping devices 71 and 72 into their extended and retracted positions. Thus, the cooling tray 53*a* immediately to the left of the dumping device 71 in Fig. 6 of the drawings will be rotated into its unloading position by the dumping device 71 so as to dump the loaves of bread carried thereby onto the chute 77 associated with the cross conveyor 61 leading to the first slicing and wrapping unit 64. Since the dumping device 72 is retracted at this point, the tray 53*a* immediately to its left in Fig. 6 of the drawings will not be intercepted, the loaves of bread carried by this particular tray previously having been dumped by the device 71.

After the foregoing events have taken place, the cam 151 arrives at a position such that the roller 154 on the switch 153 drops into the second notch 152 in the cam, thereby energizing the motor 99 for a second one-half revolution of the shaft 100. During the second one-half revolution of the shaft 100, the dumping device 71 is moved from its extended position to its retracted position so as to prevent dumping the tray 53*b* immediately to the left of the dumping device 71 in Fig. 6 of the drawings. At the same time, the dumping device 72 is moved into its extended position so as to intercept the tray 53*b* immediately to its left in Fig. 6 of the drawings so as to rotate this tray into its unloading position, thereby dumping the loaves of bread therefrom onto the chute 78 associated with the cross conveyor 62 leading to the second slicing and wrapping unit 65. The foregoing sequence of events is continuously repeated so that all of the trays 53a are dumped by the device 71 and all of the trays 53b are dumped by the device 72.

Thus, it will be apparent that with the conditions hereinbefore outlined, the bread carried by alternate trays 53 will be delivered to the slicing and wrapping unit 64 and the bread carried by the intervening trays will be delivered to the slicing and wrapping unit 65. As will be apparent, the dumping device 73, being permanently disposed in the path of the cam follower bars 89 on the trays 53, will rotate all of the trays into their unloading positions, but no bread will be delivered to the slicing and wrapping unit 66 since all of the trays will have been dumped previously by the devices 71 and 72.

Continuing to consider the operation of the distributing apparatus 60 under the control of the cam 151, it will now be assumed that the bread carried by the trays 53 is to be delivered to the slicing and wrapping units 65 and 66, with none of the bread going to the unit 64. In order to accomplish this, the operator sets the selector switch 180 in the position shown in broken lines in Fig. 14 of the drawings so as to de-energize the electromagnet 146 and energize the electromagnet 145, thereby retracting the latch 144 and disconnecting the dumping device 71 from the actuator 96. Thus, the dumping device 71 will remain in its retracted position. Under these conditions, the apparatus will operate in substantially the same manner as before except that the trays 53a identified in Fig. 6 of the drawings will not be dumped by the device 71, the trays 53b continuing to dumped by the device 71, the trays 53b continuing to be dumped by the device 72. Consequently, since the fixed dumping device 73 automatically rotates all of the trays into their unloading positions, the bread carried by the trays 53a will be dumped onto the chute 79 associated with the cross conveyor 63 leading to the third slicing and wrapping unit 66. Thus, the bread carried by the cooling conveyor 29 will be distributed to the slicing and wrapping units 65 and 66.

The bread may be distributed between the slicing and wrapping units 64 and 66 in a similar manner by setting the selector switch 190 in the position shown in broken lines in Fig. 14 of the drawings with the selector switch 180 set in the position shown in solid lines therein. It is thought that the operation of the apparatus under such conditions will be apparent and thus it will not be described.

It will be noted that if it is desired to deliver all the bread to the slicing and wrapping unit 66 for any reason, this may be accomplished by disconnecting both of the dumping devices 71 and 72 from the actuator 96. In some instances, this alternative mode of operation may be desired, as in the case of a breakdown of both the slicing and wrapping units 64 and 65.

The operation of the distributing apparatus 60 under the control of the cam 157 will now be considered. As previously pointed out, the apparatus may be operated under the control of the cam 157 to distribute the bread among all three of the slicing and wrapping units 64 to 66.

In order to place the apparatus 60 under the control of the cam 157, it is merely necessary for the operator to set the selector switch 170 in the position shown in broken lines in Fig. 14 of the drawings, thereby taking the switch 153 controlled by the cam 151 out of the circuit and placing the switch 164 controlled by the cam 157 in the circuit. In order to obtain distribution of bread to all three of the units 64 to 66, it is also necessary for the selector switches 180 and 190 to be in the positions shown in solid lines in Fig. 14 of the drawings.

It will now be assumed that the roller 163 on the switch 164 enters the notch 161 in the cam 157, thereby energizing the motor 99. Subsequently, the two-lobed cam 102 disengages the switch 103 as hereinbefore discussed to establish an alternative current path to the motor so that the switch 164 needs be closed only momentarily. Also, the cam 102 opens the switch 103 at the end of one-half of a revolution of the shaft 100 as before.

It will be assumed that during the one-half revolution of the shaft 100 resulting from closure of the switch 164 by the notch 161, the dumping device 71 is moved into its extended position and the dumping device 72 is moved into its retracted position. Because of the fact that the notch 162 is spaced 120° from the notch 161 in the clockwise direction as viewed in Fig. 14 of the drawings, instead of the 90° spacing employed for the notches 152 in the cam 151, and because of the fact that the rotational speed of the cam 157 is only two-thirds that of the cam 151, the dumping device 71 will remain extended for a time interval equal to twice that encountered during the operation of the apparatus under the control of the cam 151. In other words, the dumping device 71 will remain extended for a sufficient length of time to rotate two of the cooling trays 53 into their unloading positions, the bread dumped from such trays falling onto the cross conveyor 61 leading to the slicing and wrapping units 64. After two of the cooling trays 53 have been dumped by the device 71 in the foregoing manner, the cam 157 rotates into a position such that the roller 163 on the switch 164 drops into the notch 162, thereby energizing the motor 99 for another one-half revolution of the shaft 100. During this second one-half revolution of the shaft 100, the dumping device 71 is retracted and the dumping device 72 is extended. Again because of the fact that the rotational speed of the cam 157 is only two-thirds that of the cam 151, and because of the fact that the cam 157 must rotate through 240° to cause the roller 163 on the switch 164 to re-enter the notch 161, the dumping device 72 will remain extended for a length of time sufficient to rotate four of the cooling trays 53 into their unloading positions. However, two of these four trays will have been dumped previously by the dumping device 71 so that the contents of only two of the four trays dumped by the device 72 will be delivered to the second slicing and wrapping unit 65.

Since the dumping device 72 remains extended while four cooling trays move therepast, it follows that the first dumping device 71 will remain retracted while four loaded cooling trays pass it. Two of the loaded cooling trays 53 escaping the dumping device 71 are intercepted and dumped by the device 72, along with the two empty trays previously dumped by the device 71. Thus, out of each series of six cooling trays entering the distributing apparatus 60, two loaded trays are dumped by the device 71 and two loaded and two empty trays are dumped by the device 72, the remaining loaded pair going on to the fixed dumping device 73. Since the latter automatically rotates all of the trays into their unloading positions, the loaded pair out of each group of six reaching the device 73 is dumped thereby to supply the third slicing and wrapping unit 66.

Thus, when the distributing apparatus 60 is operated under the control of the cam 157, each of the slicing and wrapping units 64 to 66 is supplied with the loaves of bread carried by one-third of the cooling trays.

It will be apparent that, if desired for any reason, an unequal distribution of bread to two of the slicing and wrapping units 64 to 66 may be obtained with the apparatus operating under the control of the cam 157. For example, if the dumping device 71 is disconnected from the actuator 95, the contents of two-thirds of the trays will be delivered to unit 65 by the dumping device 72 and the contents of the remaining one-third of the trays will be delivered to the unit 66 by the dumping device 73. Similarly, if the dumping device 72 is disconnected from the actuator, the contents of one-third of the trays will go to the first slicing and wrapping unit 64 and the contents of the remaining two-thirds of the trays will go to the unit 66.

It will be understood that although we have disclosed a specific relationship between the elements of the control means 150 and between the control means and the cooling conveyor 29 which is applicable to the particular exemplary installation illustrated, different relationships may be required for other installations. For example, if the number of slicing and wrapping units is increased, a different relationship will be necessary. As another example, if the relationship between the spacing of the cooling trays 53 and the diameter of the cooling conveyor sprockets 35 is varied from that hereinbefore discussed, a different number of notches in the cam 151 will be required.

It will thus be apparent that our invention provides an extremely flexible selective distributing apparatus which may be employed to deliver articles in variable proportions to different destinations and that this may be accomplished by the manipulation of only a few simple controls. Although we have disclosed an exemplary embodiment of the invention for illustrative purposes and in connection with a specific installation, it will be understood that various changes, modifications and substitutions may be incorporated in the embodiment disclosed and that such an embodiment may be incorporated in other installations, all without departing from the spirit of the invention as set forth in the appended claims.

We claim as our invention:

1. In an apparatus of the character described, the combination of: a cam device movable between extended and retracted positions; means comprising an actuator and linkage means connecting said actuator to said cam device for moving said cam device between said extended and retracted positions, said linkage means comprising a tube and a rod reciprocable in said tube; and manually controlled means for latching said rod and said tube together to prevent relative telescoping movement thereof, said latching means comprising a lever pivotally connected to said tube at a first point on said lever, a latch pivotally connected to said lever at a second point on said lever, and a pair of electromagnets respectively pivotally connected to said lever at points on opposite sides of said first point.

2. In a distributing apparatus, the combination of: a conveyor comprising a plurality of receptacles respectively rotatable into unloading positions; a tripping device movable between an extended position wherein it is disposed in the path of said receptacles and is engageable thereby to rotate said receptacles into their respective unloading positions and a retracted position wherein it is out of said path and not engageable by said receptacles; an actuator including a crank and an electric motor; means operatively connected to and driven by said conveyor for periodically energizing said electric motor at a frequency proportional to the speed of said conveyor; means for deenergizing said electric motor after it has rotated said crank through a part of a revolution; and means connecting said tripping device to said crank.

3. An apparatus as defined in claim 2 wherein the means last defined includes: a connecting element connected to said crank; another connecting element connected to said tripping device and operatively engageable with the connecting element first mentioned; and manually controlled means for operatively engaging said connecting elements.

HERBERT L. GLAZE.
ROBERT C. BELTZ.

References Cited in the file of this patent

UNITED STATES PATENTS

| Number | Name | Date |
|---|---|---|
| 837,405 | Holmes | Dec. 4, 1906 |
| 1,322,840 | Streich | Nov. 25, 1919 |
| 1,790,641 | Engel | Feb. 3, 1931 |
| 2,082,945 | Ferenci | June 8, 1937 |
| 2,129,067 | McIntyre | Sept. 6, 1938 |
| 2,426,304 | Hapman | Aug. 26, 1947 |

FOREIGN PATENTS

| Number | Country | Date |
|---|---|---|
| 2,208,543 | Germany | Mar. 30, 1909 |